US011092041B2

(12) United States Patent
Grelet

(10) Patent No.: US 11,092,041 B2
(45) Date of Patent: Aug. 17, 2021

(54) CONDENSER ASSEMBLY AND CONTROL METHOD FOR USE WITH RANKINE POWER SYSTEM

(71) Applicant: Tenneco GmbH, Edenkoben (DE)

(72) Inventor: Vincent Grelet, Landau in der Pfalz (DE)

(73) Assignee: Tenneco GmbH, Edenkoben (DE)

( * ) Notice: Subject to any disclaimer, the term of this patent is extended or adjusted under 35 U.S.C. 154(b) by 195 days.

(21) Appl. No.: 15/974,026

(22) Filed: May 8, 2018

(65) Prior Publication Data

US 2019/0093519 A1   Mar. 28, 2019

Related U.S. Application Data

(60) Provisional application No. 62/562,017, filed on Sep. 22, 2017.

(51) Int. Cl.
*F01K 23/06* (2006.01)
*F01K 23/10* (2006.01)
(Continued)

(52) U.S. Cl.
CPC ............ *F01K 23/101* (2013.01); *B60K 13/04* (2013.01); *F01K 9/003* (2013.01); *F01K 13/02* (2013.01);
(Continued)

(58) Field of Classification Search
CPC ....... B60K 13/04; F01K 23/065; F01K 9/003; F01P 5/10; F01P 7/161; F01P 2007/146; F02G 5/02; F01N 2240/02; F01N 5/02
(Continued)

(56) References Cited

U.S. PATENT DOCUMENTS 3,512,358 A   5/1970   Schmidt
6,910,333 B2   6/2005   Minemi et al.
(Continued)

FOREIGN PATENT DOCUMENTS

AT            507096 A4   2/2010
DE      102009028467 A1   2/2011
(Continued)

OTHER PUBLICATIONS

International Search Report, dated Nov. 23, 2018, corresponding to PCT/IB2018/056603, ISA/EPO.
(Continued)

*Primary Examiner* — Lindsay M Low
*Assistant Examiner* — Omar Morales
(74) *Attorney, Agent, or Firm* — Harness, Dickey & Pierce, P.L.C.

(57) ABSTRACT

A waste heat recovery system in thermal communication with an exhaust conduit of an internal combustion engine of a vehicle includes a condenser. The condenser includes a working fluid conduit configured to connect to a working fluid loop of the waste heat recovery system and a coolant fluid conduit configured to connect to a coolant fluid loop used to cool the internal combustion engine of the vehicle. The coolant fluid conduit includes a coolant fluid inlet and a coolant fluid outlet. The waste heat recovery system also includes a coolant fluid bypass fluidly connected between the coolant fluid inlet and the coolant fluid outlet. The coolant fluid bypass includes a coolant fluid control valve configured to vary a portion of the volume of coolant fluid that flows through the coolant fluid bypass based on a temperature of a working fluid in the working fluid loop.

12 Claims, 6 Drawing Sheets

(51) Int. Cl.
<table>
<tr><td>F01N 3/00</td><td>(2006.01)</td></tr>
<tr><td>F01P 3/12</td><td>(2006.01)</td></tr>
<tr><td>F01K 13/02</td><td>(2006.01)</td></tr>
<tr><td>F01P 3/20</td><td>(2006.01)</td></tr>
<tr><td>F01K 9/00</td><td>(2006.01)</td></tr>
<tr><td>F01N 13/00</td><td>(2010.01)</td></tr>
<tr><td>B60K 13/04</td><td>(2006.01)</td></tr>
<tr><td>F01N 3/04</td><td>(2006.01)</td></tr>
<tr><td>F01N 5/02</td><td>(2006.01)</td></tr>
<tr><td>F01N 5/04</td><td>(2006.01)</td></tr>
<tr><td>F01P 5/10</td><td>(2006.01)</td></tr>
<tr><td>F01P 7/16</td><td>(2006.01)</td></tr>
<tr><td>F01P 11/16</td><td>(2006.01)</td></tr>
<tr><td>F01P 11/18</td><td>(2006.01)</td></tr>
<tr><td>F02G 5/02</td><td>(2006.01)</td></tr>
<tr><td>F01N 3/021</td><td>(2006.01)</td></tr>
<tr><td>F01N 3/08</td><td>(2006.01)</td></tr>
<tr><td>F01N 3/035</td><td>(2006.01)</td></tr>
<tr><td>F01N 3/10</td><td>(2006.01)</td></tr>
<tr><td>F01N 9/00</td><td>(2006.01)</td></tr>
<tr><td>F01N 3/20</td><td>(2006.01)</td></tr>
<tr><td>F01P 7/14</td><td>(2006.01)</td></tr>
<tr><td>F01K 15/02</td><td>(2006.01)</td></tr>
</table>

(52) U.S. Cl.
CPC ............ *F01K 23/065* (2013.01); *F01K 23/10* (2013.01); *F01N 3/005* (2013.01); *F01N 3/043* (2013.01); *F01N 5/02* (2013.01); *F01N 5/04* (2013.01); *F01N 13/00* (2013.01); *F01P 3/12* (2013.01); *F01P 3/20* (2013.01); *F01P 5/10* (2013.01); *F01P 7/161* (2013.01); *F01P 11/16* (2013.01); *F01P 11/18* (2013.01); *F02G 5/02* (2013.01); *B60Y 2200/142* (2013.01); *F01K 15/02* (2013.01); *F01N 3/021* (2013.01); *F01N 3/035* (2013.01); *F01N 3/0814* (2013.01); *F01N 3/0842* (2013.01); *F01N 3/0857* (2013.01); *F01N 3/101* (2013.01); *F01N 3/103* (2013.01); *F01N 3/106* (2013.01); *F01N 3/2066* (2013.01); *F01N 9/00* (2013.01); *F01N 13/009* (2014.06); *F01N 2240/02* (2013.01); *F01P 2007/146* (2013.01); *F01P 2025/08* (2013.01); *F01P 2060/14* (2013.01); *F02G 2254/15* (2013.01); *F02G 2280/50* (2013.01)

(58) Field of Classification Search
USPC ...................................................... 123/41.09
See application file for complete search history.

(56) References Cited

U.S. PATENT DOCUMENTS

<table>
<tr><td>7,159,400 B2</td><td>1/2007</td><td>Tsutsui et al.</td></tr>
<tr><td>7,454,910 B2</td><td>11/2008</td><td>Hamada et al.</td></tr>
<tr><td>7,475,541 B2</td><td>1/2009</td><td>Ibaraki et al.</td></tr>
<tr><td>8,707,688 B2</td><td>4/2014</td><td>Raab et al.</td></tr>
<tr><td>8,752,378 B2</td><td>6/2014</td><td>Ernst et al.</td></tr>
<tr><td>8,985,066 B2</td><td>3/2015</td><td>Lutz et al.</td></tr>
<tr><td>9,334,760 B2</td><td>5/2016</td><td>Ernst et al.</td></tr>
<tr><td>9,494,055 B2</td><td>11/2016</td><td>Rusche</td></tr>
<tr><td>9,587,521 B2</td><td>3/2017</td><td>Eybergen</td></tr>
<tr><td>9,587,546 B2</td><td>3/2017</td><td>Hussain et al.</td></tr>
<tr><td>9,745,869 B2</td><td>8/2017</td><td>Ernst et al.</td></tr>
<tr><td>9,784,139 B2</td><td>10/2017</td><td>Shaffer et al.</td></tr>
<tr><td>10,240,488 B2</td><td>3/2019</td><td>Irmler et al.</td></tr>
<tr><td>10,316,726 B2</td><td>6/2019</td><td>Jerges et al.</td></tr>
<tr><td>2010/0037838 A1</td><td>2/2010</td><td>Moench et al.</td></tr>
<tr><td>2011/0167818 A1</td><td>7/2011</td><td>Tsuchino et al.</td></tr>
<tr><td>2012/0159951 A1</td><td>6/2012</td><td>Avery et al.</td></tr>
<tr><td>2012/0198840 A1*</td><td>8/2012</td><td>Stegmaier ............... F02B 39/08<br>60/605.1</td></tr>
<tr><td>2013/0199178 A1*</td><td>8/2013</td><td>Kanou ...................... F01K 7/22<br>60/605.2</td></tr>
<tr><td>2013/0327041 A1</td><td>12/2013</td><td>Gaertner et al.</td></tr>
<tr><td>2015/0121866 A1</td><td>5/2015</td><td>Xia</td></tr>
<tr><td>2015/0135708 A1</td><td>5/2015</td><td>Lutz et al.</td></tr>
<tr><td>2016/0017973 A1</td><td>1/2016</td><td>Steidten et al.</td></tr>
<tr><td>2016/0186616 A1</td><td>6/2016</td><td>Matsumoto et al.</td></tr>
<tr><td>2016/0201519 A1</td><td>7/2016</td><td>Zhou</td></tr>
<tr><td>2018/0114890 A1</td><td>4/2018</td><td>Chauvin</td></tr>
<tr><td>2019/0128147 A1</td><td>5/2019</td><td>Liu et al.</td></tr>
</table>

FOREIGN PATENT DOCUMENTS

<table>
<tr><td>DE</td><td>102009050068 A1</td><td>4/2011</td></tr>
<tr><td>DE</td><td>102012209808 A1</td><td>12/2013</td></tr>
<tr><td>DE</td><td>102012209811 A1</td><td>12/2013</td></tr>
<tr><td>DE</td><td>102012209813 A1</td><td>12/2013</td></tr>
<tr><td>DE</td><td>102013021578 A1</td><td>7/2014</td></tr>
<tr><td>DE</td><td>102013211875 A1</td><td>1/2015</td></tr>
<tr><td>DE</td><td>102013222511 A1</td><td>5/2015</td></tr>
<tr><td>DE</td><td>102016012528 A1</td><td>4/2017</td></tr>
<tr><td>DE</td><td>102015224416 A1</td><td>6/2017</td></tr>
<tr><td>EP</td><td>2824300 A1</td><td>1/2015</td></tr>
<tr><td>EP</td><td>2933444 A1</td><td>10/2015</td></tr>
<tr><td>EP</td><td>3026246 A1</td><td>6/2016</td></tr>
<tr><td>EP</td><td>3098399 A1</td><td>11/2016</td></tr>
<tr><td>JP</td><td>2014190276 A</td><td>10/2014</td></tr>
<tr><td>WO</td><td>2014064484 A1</td><td>5/2014</td></tr>
<tr><td>WO</td><td>2016155705 A1</td><td>10/2016</td></tr>
<tr><td>WO</td><td>2017123132 A1</td><td>7/2017</td></tr>
</table>

OTHER PUBLICATIONS

Horst, Tilmann Abbe: "Betrieb eines rankine—prozesses zur abgaswärmenutzung im pkw", Jan. 1, 2015 (Jan. 1, 2015), XP055518930, Retrieved from the Internet: URL:http: / /ift -bs.de /images /Dokumente /horst_diss.pdf, (pp. 33-54) (pp. 55-58) (pp. 8, 34, pp. 55-59).

International Search Report, dated Nov. 26, 2018, corresponding to PCT/IB2018/056608, ISA/EPO.

International Search Report and Written Opinion, dated Nov. 23, 2018, corresponding to PCT/IB2018/056607, ISA/EPO.

* cited by examiner

CONDENSER ASSEMBLY AND CONTROL METHOD FOR USE WITH RANKINE POWER SYSTEM

CROSS-REFERENCE TO RELATED APPLICATIONS

This application claims the benefit of U.S. Provisional Application No. 62/562,017 filed on Sep. 22, 2017. The entire disclosure of the above application is incorporated herein by reference.

FIELD

The present disclosure relates to a system that converts energy in form of heat within an exhaust system of an internal combustion engine to a more useful form of energy using the principles of a Rankine cycle.

BACKGROUND

This section provides background information related to the present disclosure and is not necessarily prior art.

Internal combustion engines often include an exhaust system that expels and treats the gases produced during the controlled combustion inside the engine. The gases that are produced during the controlled combustion are expelled at elevated temperatures. The energy associated with these heated gases is often transferred to the atmosphere resulting in inefficiencies in the internal combustion engine.

While diesel engines are known for being somewhat more efficient than other types of internal combustion engines, diesel engines also suffer from large inefficiencies that result from the expulsion of exhaust gases at elevated temperatures. The exhaust systems that are used in connection with diesel internal combustion engines often include aftertreatment systems that can contain a catalyst, a particulate filter and a deNox device to treat the gases expelled from the diesel internal combustion engine. After the expelled gases are treated, the gases remain at elevated temperatures. Instead of wasting the energy associated with the exhaust gases, the principles of the aforementioned Rankine cycle can be utilized to recover energy that can be used by various systems in the vehicle.

Known systems that attempt to recapture the energy associated with exhaust gases suffer from several disadvantages. Known systems are often bulky, complex and are difficult to integrate into existing vehicle systems. Known systems are also expensive, inefficient and difficult to service and maintain.

SUMMARY

This section provides a general summary of the disclosure, and is not a comprehensive disclosure of its full scope or all of its features.

In an aspect of the present disclosure, a waste heat recovery system in thermal communication with an exhaust conduit of an internal combustion engine of a vehicle includes a condenser. The condenser includes a working fluid conduit configured to connect to a working fluid loop of the waste heat recovery system and a coolant fluid conduit configured to connect to a coolant fluid loop used to cool the internal combustion engine of the vehicle. The coolant fluid conduit includes a coolant fluid inlet and a coolant fluid outlet wherein a volume of coolant fluid flows from the coolant fluid inlet to the coolant fluid outlet when the coolant fluid conduit is connected to the coolant fluid loop. The waste heat recovery system also includes a coolant fluid bypass fluidly connected between the coolant fluid inlet and the coolant fluid outlet. The coolant fluid bypass includes a coolant fluid control valve configured to vary a portion of the volume of coolant fluid that flows through the coolant fluid bypass based on a temperature of a working fluid in the working fluid loop.

In another aspect of the present disclosure, a waste heat recovery system in thermal communication with an exhaust conduit of an internal combustion engine of a vehicle includes a working fluid loop fluidly connecting a working fluid pump, an evaporator and an expander. The working fluid loop allows a volume of working fluid to flow therethrough. The waste heat recovery system also includes a condenser assembly fluidly connected to the working fluid loop between the expander and the working fluid pump. The condenser assembly includes a coolant fluid conduit configured to connect to a coolant fluid loop of a coolant system of the vehicle. The coolant fluid conduit includes a coolant fluid inlet and a coolant fluid outlet wherein a volume of coolant fluid of the coolant system flows from the coolant fluid inlet to the coolant fluid outlet when the coolant fluid conduit is connected to the coolant fluid loop. The condenser assembly also includes a coolant fluid bypass fluidly connected between the coolant fluid inlet and the coolant fluid outlet. The coolant fluid bypass includes a coolant fluid control valve configured to vary a portion of the volume of coolant fluid that flows through the coolant fluid bypass. The waste heat recovery system also includes a temperature sensor positioned downstream of the condenser assembly and operable to output a signal indicative of a temperature of the working fluid before the working fluid enters the working fluid pump. The waste heat recovery system also includes a control unit in communication with the temperature sensor and the coolant fluid control valve, wherein the control unit selectively controls the coolant fluid control valve to vary the portion of the volume of coolant fluid that flows through the coolant fluid bypass based on the signal from the temperature sensor.

In still another aspect of the present disclosure, a method of controlling a temperature of a working fluid in a waste heat recovery system is provided. The method includes operating a coolant fluid pump to cause coolant fluid to flow at a constant flow rate through a coolant fluid conduit in a condenser assembly. The method also includes receiving a signal from a temperature sensor indicative of a temperature of a working fluid in a working fluid loop, wherein the working fluid loop is in thermal communication with an exhaust conduit of an internal combustion engine. The method also includes comparing the temperature of the working fluid in the working fluid loop to one or more predetermined thresholds and adjusting a portion of coolant fluid flowing through a coolant bypass based on the temperature of the working fluid in the working fluid loop.

Other advantages and objects of the present disclosure will become apparent to those skilled in the art from the subsequent detailed description, appended claims and drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
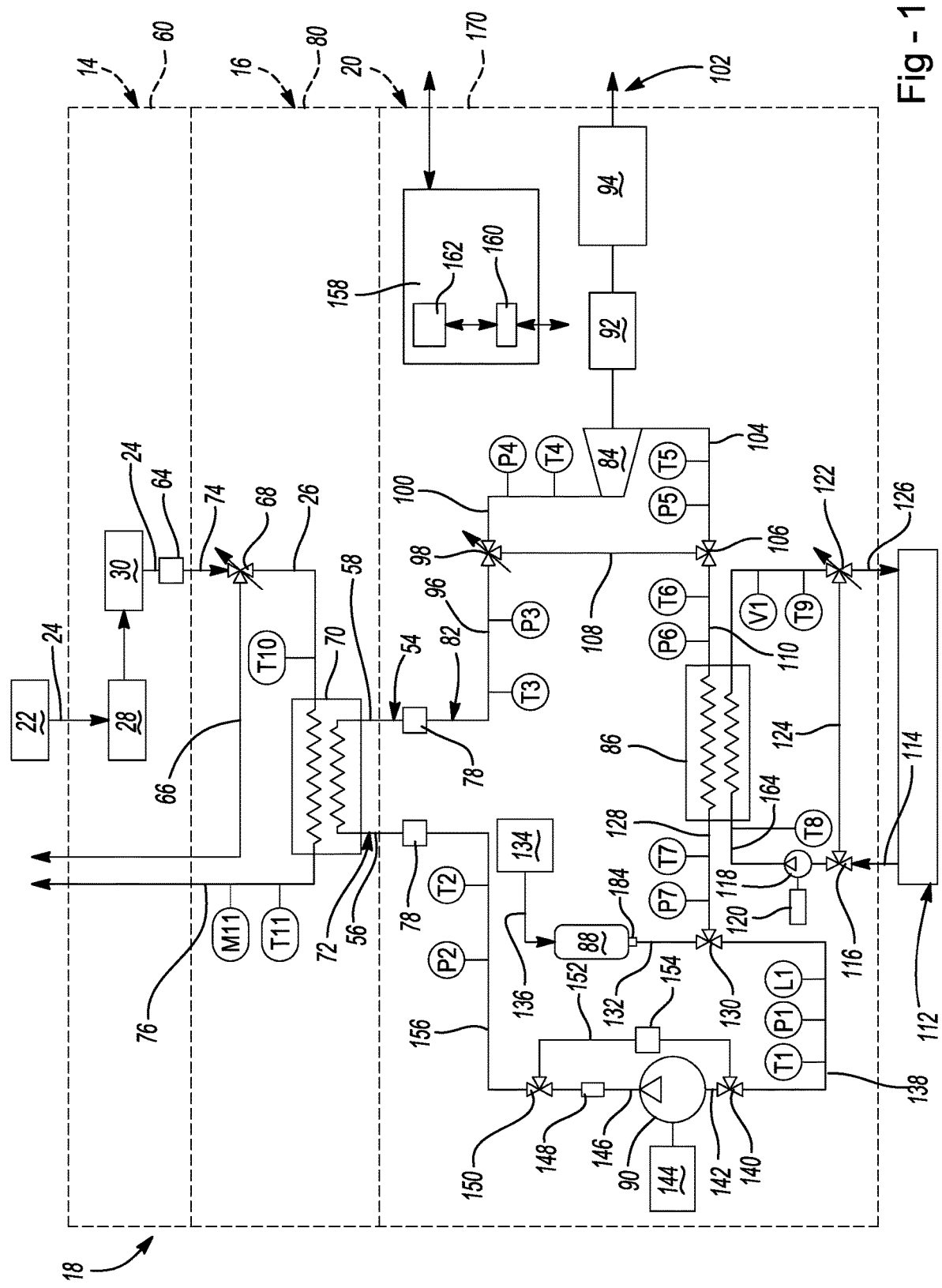
FIG. 1 is a block diagram showing one example power system in accordance with the present disclosure.

FIG. 1 illustrates an example embodiment of a power system 18 in accordance with the present disclosure. The power system 18 is a Rankine power system in that it utilizes the principles of the Rankine thermodynamic cycle to convert heat energy into mechanical energy during the phase change of a working fluid.

As shown in FIG. 1, the power system 18, in one example, includes an aftertreatment assembly 14, an evaporator assembly 16 and a power pack 20. The aftertreatment assembly 14, the evaporator assembly 16 and the power pack 20, as will be further explained below, are separate assemblies that can be easily joined together (and separated for service and/or maintenance) to convert heat from exhaust gases that are generated by an internal combustion engine to mechanical and/or electrical energy.

The power system 18 is an improvement over existing systems in that the aftertreatment assembly 14, the evaporator assembly 16 and the power pack 20 can be added to existing vehicles for the conversion of energy (in the form of heat) to mechanical and/or electrical energy. As will be further explained below, the aftertreatment assembly 14, the evaporator assembly 16 and/or the power pack 20 can be packaged in discrete, separable modular enclosures that can be added to existing vehicles. In addition, one or more of the aftertreatment assembly 14, the evaporator assembly 16 and the power pack 20 can be configured in different arrangements so as to be connected to vehicles that may be equipped with an existing aftertreatment assembly 14. The structure of the aftertreatment assembly 14, the evaporator assembly 16 and the power pack 20 result in a power system 18 that is easily installed, serviced and/or maintained in addition to converting waste heat energy into usable mechanical and/or electrical energy.

Figure 2:
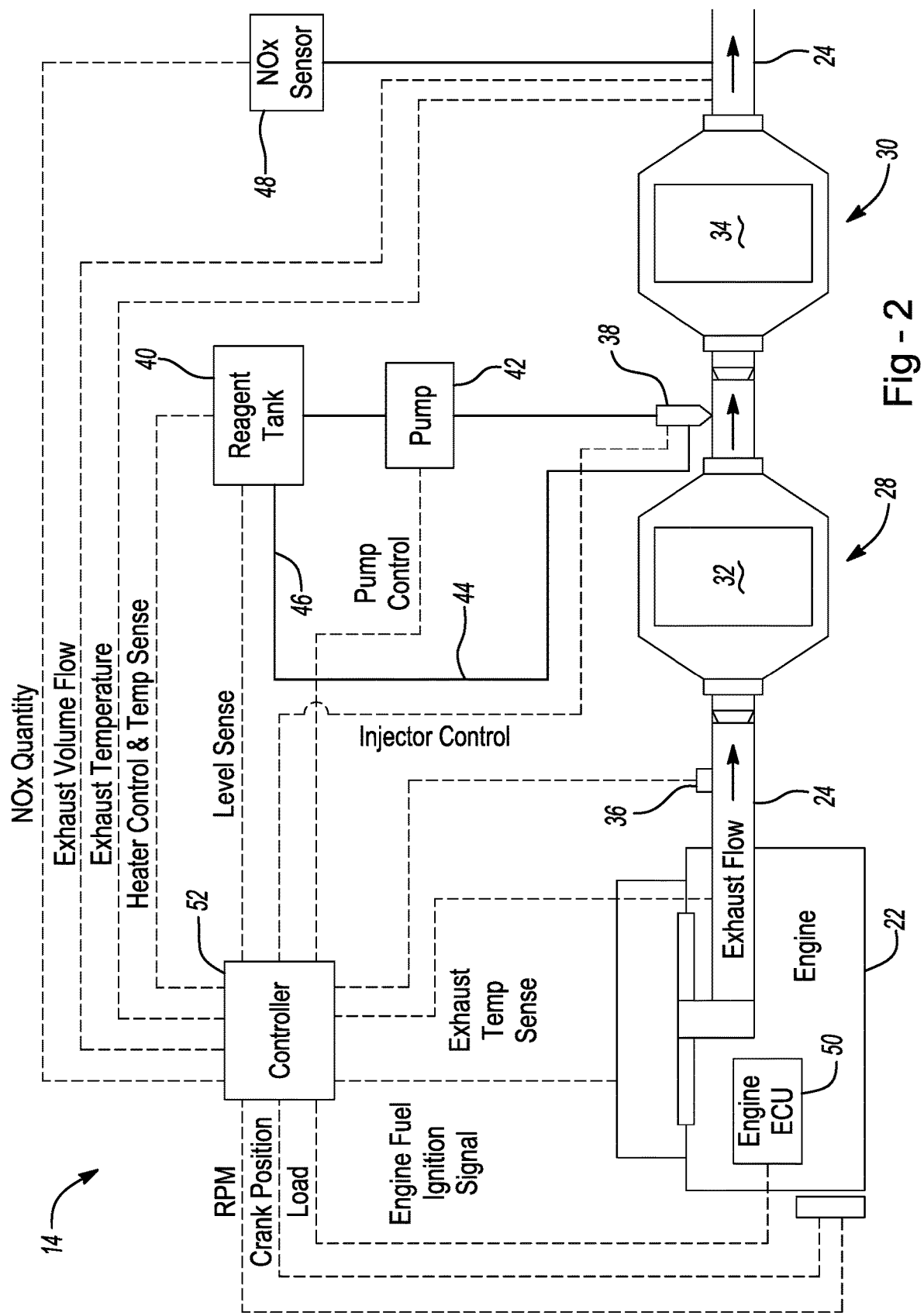
FIG. 2 is a schematic illustration of an example aftertreatment assembly used in the power system of FIG. 1.

Referring now to FIG. 2, the aftertreatment assembly 14 can include one or more devices used to reduce emissions produced by the internal combustion engine 22. FIG. 2 schematically illustrates an example aftertreatment assembly 14. The aftertreatment assembly 14 is positioned in communication with an internal combustion engine 22 that is in communication with a fuel source (not shown) that, once consumed, will produce exhaust gases that are discharged into an exhaust conduit 24. Downstream from the engine 22 can be disposed a pair of exhaust treatment components 28 and 30, which can include catalyst-coated substrates or filters 32 and 34. The catalyst-coated substrates or filters 32 and 34 can be any combination of a diesel particulate filter (DPF), a diesel oxidation catalyst (DOC) component, a selective catalytic reduction (SCR) component, a lean NOX catalyst, an ammonia slip catalyst, a catalyst-coated (e.g., SCR or DOC) DPF, NOX absorber, $CO_2$ capture catalyst, or any other type or combination of exhaust treatment devices known to one skilled in the art.

Although not required by the present disclosure, the aftertreatment assembly 14 can further include components such as a thermal enhancement device or burner 36 to increase a temperature of the exhaust gases passing through exhaust conduit 24. Increasing the temperature of the exhaust gas is favorable to achieve light-off of the catalyst in the exhaust treatment component 28 in cold-weather conditions and upon start-up of engine 22, as well as initiate regeneration of the exhaust treatment component 28 when the exhaust treatment substrate 32 or 34 is a DPF. The thermal enhancement device or burner 36 can also be used to increase the temperature of the exhaust gas to achieve an improvement in the performance and/or efficiency of the power pack 20.

To assist in reduction of the emissions produced by the engine 22, the aftertreatment assembly 14 can include a dosing module 38 for periodically dosing an exhaust treatment fluid into the exhaust stream. As illustrated in FIG. 2, the dosing module 38 can be located upstream of the exhaust treatment component 28, and is operable to inject an exhaust treatment fluid into the exhaust stream. In this regard, the dosing module 38 is in fluid communication with a reagent tank 40 and a pump 42 by way of an inlet line 44 to dose an exhaust treatment fluid such as diesel fuel or urea into the exhaust conduit 24 upstream of the exhaust treatment components 28 and 30. The dosing module 38 can also be in communication with the reagent tank 40 via a return line 46. The return line 46 allows for any exhaust treatment fluid not dosed into the exhaust stream to be returned to the reagent tank 40. Flow of the exhaust treatment fluid through the inlet line 44, the dosing module 38, and the return line 46 also assists in cooling the dosing module 38 so that the dosing module 38 does not overheat. Although not illustrated in the drawings, the dosing module 38 can be configured to include a cooling jacket that passes a coolant around the dosing module 38 to cool it.

The amount of exhaust treatment fluid required to effectively treat the exhaust stream may vary with load, engine speed, exhaust gas temperature, exhaust gas flow, engine fuel injection timing, desired NOx reduction, barometric pressure, relative humidity, EGR rate and engine coolant temperature. A NOx sensor or meter 48 may be positioned downstream from exhaust treatment component 28. The NOx sensor or meter 48 may also be positioned upstream or between the exhaust treatment components 28 and 30. The NOx sensor 48 is operable to output a signal indicative of the exhaust NOx content to an engine control unit (ECU) 50. The NOx sensor or meter 48 may also be replaced by a particulate matter sensor. All or some of the engine operating parameters may be supplied from the engine control unit 50 via the engine/vehicle databus to a reagent electronic dosing controller 52. The reagent electronic dosing controller 52 could also be included as part of the engine control unit 50. Exhaust gas temperature, exhaust gas flow and exhaust back pressure and other vehicle operating parameters may be measured by respective sensors, as indicated in FIG. 2.

As can be appreciated, not all the illustrated components are required nor may be included in the aftertreatment assembly 14. The type of the engine 22, the size of the vehicle, packaging restraints and other factors may vary the size and internal components of the aftertreatment assembly 14. Referring back to FIG. 1, the aftertreatment assembly 14 can be positioned inside a first housing 60. The first housing 60 may include a support structure and a first cover. The packaging of the aftertreatment assembly 14 in the first housing 60 can limit the size and quantity of aftertreatment components that are included in the aftertreatment assembly 14.

As shown in the example of FIG. 1, the aftertreatment assembly 14 includes the exhaust conduit 24 that permits exhaust gases to flow to the exhaust treatment components 28 and 30. After exiting the exhaust treatment components 28 and 30, the exhaust gases can flow to the evaporator assembly 16 through the exhaust conduit 24. The aftertreatment assembly 14 can include an exhaust service connector 64 that fluidly connects the exhaust conduit 24 to an evaporator assembly exhaust line 74. The exhaust service connector 64 may be positioned at any number of positions along the exhaust conduit 24, including at a position inside the evaporator assembly 16 rather than inside the aftertreatment assembly 14 as shown. The exhaust service connector 64 can be any suitable connector that permits the evaporator assembly exhaust line 74 to be easily connected (and disconnected) from the exhaust conduit 24 extending from the aftertreatment assembly 14. The exhaust service connector 64 can be a circumferential clamp that encircles the exhaust conduit 24 or the exhaust service connector 64 can include a pair of mating flanged fittings that are joined together using one or more fasteners, for example. The exhaust service connector 64 permits the evaporator assembly 16 to be coupled to the aftertreatment assembly 14 without the need for specialized tools such that the power system 18 can be easily installed, serviced and/or maintained.

Referring back to FIG. 1, the evaporator assembly 16 operates to place the exhaust gases flowing from the exhaust conduit 24 in thermal communication with a working fluid in the working fluid loop 54 inside an evaporator 70. The working fluid loop 54 includes a first portion 72 and a second portion 82. The first portion 72 of the working fluid loop 54 is positioned inside the evaporator assembly 16 and is connected to a second portion 82 that is positioned inside the power pack 20. Together, the first portion 72 and the second portion 82 fluidly connect the various components of the power pack 20 (as will be further described below) in the closed working fluid loop 54.

As shown in FIG. 1, the evaporator assembly 16 can include an exhaust bypass 66, an exhaust bypass valve 68, the evaporator 70, and an exhaust outlet 76. The exhaust bypass 66 is a length of conduit that extends from the bypass valve 68 along a path outside of the evaporator 70 to the atmosphere. The bypass valve 68 is connected to the evaporator assembly exhaust line 74 and operates to selectively divert a portion of the exhaust gases through the exhaust bypass 66 rather than flowing to the evaporator 70 through an evaporator exhaust inlet 26. The bypass valve 68 can be a suitable control valve that is operatively coupled to a power pack control unit 158 (described further below) or to other control modules such as the engine control unit 50 (FIG. 2). The exhaust bypass 66 can be utilized to control operating conditions of the evaporator 70 and/or to control a temperature and/or pressure of the working fluid flowing out of the evaporator 70 at an evaporator outlet 58.

The exhaust gases that are not diverted through the exhaust bypass 66 are routed through the evaporator 70 via the evaporator exhaust inlet 26. The exhaust gases can then exit the evaporator 70 through the exhaust outlet 76 and be emitted to the atmosphere. As can be appreciated, a suitable plenum or other exhaust mixing chamber can be included in the evaporator assembly 16 or downstream of the evaporator assembly 16 to combine the exhaust gases in the exhaust outlet 76 and from the exhaust bypass 66 before or after the exhaust gases exit the evaporator assembly 16 and are emitted to the atmosphere.

As further shown, the evaporator assembly 16 can also include one or more temperature sensors T10, T11 and/or a mass flow sensor M11. In the example shown, the temperature sensor T10 is positioned in the evaporator exhaust inlet 26. The temperature sensor T11 and the mass flow sensor M11 are positioned in the exhaust outlet 76. The temperature sensors T10, T11 and the mass flow sensor M11 can be in communication with the power pack control unit 158 to monitor and/or control the operating parameters of the power system 18.

As further shown, the working fluid in the working fluid loop 54 flows through the evaporator 70 from an evaporator inlet 56 to the evaporator outlet 58. The evaporator 70 can be any suitable evaporator that places the exhaust gases in thermal communication with the working fluid of the working fluid loop 54. For example, the evaporator 70 can be a suitable fin and tube heat exchanger operable to cause heat transfer between the exhaust gases flowing from the evaporator exhaust inlet 26 to the exhaust outlet 76 and the working fluid flowing from the evaporator inlet 56 to the evaporator outlet 58.

The evaporator assembly 16 is positioned inside a second housing 80. The second housing 80 can include a support structure and a second cover. In the example shown in FIG. 1, the evaporator assembly 16 is positioned directly adjacent the aftertreatment assembly 14. As will be described further below, the second housing 80 is sized and configured to mount directly to the aftertreatment assembly 14. As can be appreciated, the second housing 80 can be sized such that when the second housing 80 is mounted to the first housing 60, the exhaust conduit 24 is aligned with the exhaust service connector 64 such that the exhaust conduit 24 can be easily connected (or disconnected) during installation, service and/or maintenance.

As further shown in FIG. 1, the power pack 20 is positioned directly adjacent the evaporator assembly 16 on a side of the evaporator assembly 16 opposite to the aftertreatment assembly 14. In this position, the second portion 82 of the working fluid loop 54 can be connected to the first portion 72 of the working fluid loop 54 via two working fluid loop service connectors 78. When connected, the first portion 72 and the second portion 82 of the working fluid loop 54 define a closed loop in which a working fluid can be transmitted between the components of the power pack 20. The service connectors 78 can be any suitable sealing connectors such as so-called "quick" connectors, longitudinal connectors, threaded connectors, compression connectors or the like. The service connectors 78 can enable the second portion 82 of the working fluid loop 54 to be connected to the first portion 72 of the working fluid loop 54 without the need for specialized tools such that the power pack 20 can be connected or disconnected from the evaporator assembly 16 during installation, service or maintenance.

As shown, the power pack 20 may include an expander 84, a condenser 86, a tank (or accumulator) 88 and a working fluid pump 90. The second portion 82 of the working fluid loop 54 fluidly connects the aforementioned components of the power pack 20. As shown, an evaporator line 96 is fluidly connected to the evaporator outlet 58 by the service connector 78. The evaporator line 96 is also connected to an expander control valve 98. An expander inlet line 100 connects the expander control valve 98 to the expander 84.

Any suitable expander 84, such as a turbine, reciprocal, Wankel or helical expander, can be used. As the working fluid moves through the expander 84, one or more elements of the expander 84 rotates. This rotational movement (or mechanical energy) can then be converted into electrical energy by a generator 92. The generator 92 can be connected to a battery 94. The battery 94 can store the electrical energy produced by the generator 92 and use the electrical energy for subsequent use at the output 102 of the battery 94. In the example shown, the battery 94 is shown as located inside the power pack 20. In other examples the generator 92 can be coupled to a battery 94 that is positioned remote from the power pack 20.

The working fluid loop 54 continues from the expander 84 along the expander outlet line 104 to a condenser mixing valve 106. As shown, the power pack 20 can include an expander bypass 108. The expander bypass 108 fluidly connects the expander control valve 98 to the condenser mixing valve 106. As can be appreciated, the expander control valve 98 can operate to selectively cause all or some of the working fluid to flow through the expander bypass 108 instead of flowing through the expander 84. The volume of working fluid that is diverted through the expander bypass 108 can mix with the volume of working fluid that passed through the expander 84 in the condenser mixing valve 106. The working fluid can then flow from the condenser mixing valve 106 into the condenser 86 in a condenser working fluid inlet 110.

The condenser 86 can be any suitable condenser that permits heat transfer between a coolant fluid in a cooling system 112 and the working fluid passing through the condenser 86. As such, the working fluid in the working fluid loop 54 is in thermal communication with the coolant fluid in the cooling system 112. As will be further described below, the cooling system 112 can include a radiator 212 (FIG. 4) and can also permit the coolant fluid to flow through the engine 22.

The coolant fluid from the cooling system 112 flows into the power pack 20 through a cooling system outlet 114. As shown in FIG. 1, the power pack 20 can include a coolant fluid mixing valve 116 and a coolant fluid pump 118 coupled to a coolant fluid drive motor 120. The power pack 20 can also include a coolant fluid control valve 122 and a coolant fluid bypass 124. The coolant fluid control valve 122 can selectively divert a portion of the volume of coolant fluid flowing out of the condenser 86 from the coolant fluid outlet 166 through the coolant fluid bypass 124 instead of permitting the coolant fluid to pass out of the power pack 20 and back into the cooling system 112. The coolant fluid pump 118 is coupled to the coolant fluid drive motor 120. The coolant fluid drive motor 120 (and/or the coolant fluid pump 118) can be in communication with the power pack control unit 158. The power pack control unit 158 can variably control the coolant fluid pump 118 to cause the coolant to flow into the coolant fluid inlet 164 of the condenser 86 at a predetermined set of operating parameters. In one example described in further detail below, the coolant fluid pump 118 can operate to cause the coolant fluid to flow at a constant mass flow rate through the condenser 86.

The working fluid loop 54 continues at the condenser working fluid outlet 128 at which the working fluid leaves the condenser 86. The condenser working fluid outlet 128 connects the condenser 86 to the tank mixing valve 130. The tank 88 is connected to the tank mixing valve 130 by the tank connecting line 132. The tank 88 can be any suitable expansion tank or other accumulator. The tank 88 can include a pressure sensor that is in communication with the power pack control unit 158. As such, the power pack control unit 158 can determine the pressure in the tank 88. The power pack control unit 158 can monitor the pressure in the tank 88 and maintain the pressure in the tank at a minimum desirable tank pressure in order to maximize the efficiency of the power pack 20.

The tank 88, in the example shown, is connected to a pressurized fluid source 134. In the example shown, the pressurized fluid source 134 can be a dedicated compressor assembly that is included in the power pack 20 and supplies pressurized air only to the tank 88. In other examples, the pressurized fluid source 134 can be located remotely from the power pack 20 and be coupled to the tank 88 by a pressurized fluid line 136. For example, a remotely located pressurized fluid source 134 can be a separate compressor assembly used to supply pressurized air to a brake system or other pneumatic system of the vehicle.

As shown, the tank 88 includes a single inlet/outlet (or working fluid port) 184 at tank connecting line 132. The tank connecting line 132 permits working fluid to flow into the tank 88 and to flow from the tank 88. The tank connecting line is connected to the tank mixing valve 130 to fluidly connect the tank 88 to both the condenser working fluid outlet 128 and to the pump connecting line 138.

The pump connecting line 138 connects the tank mixing valve 130 to the pump inlet mixing valve 140. The pump inlet mixing valve 140 is also connected to the working fluid pump inlet 142. The working fluid pump inlet 142 connects the working fluid loop 54 to the pump 42. The pump 42 can be any suitable pump for moving or pressurizing the working fluid in the power pack 20. The pump 42, for example, can be a reciprocating pump, a gear pump, a vane pump or a membrane pump. The pump 42 can be coupled to a working fluid pump motor 144. As can be appreciated, the working fluid pump motor 144 can be in communication with the power pack control unit 158. The power pack control unit 158 can cause the pump 42 to change the operating parameters (e.g., temperature, pressure, flow rate, etc.) of the power pack 20.

The working fluid leaves the pump 42 through the working fluid pump outlet 146. The working fluid pump outlet 146 can include a filter 148 that can remove contaminants or other particulate matter from the working fluid. The working fluid pump outlet 146 connects the pump 42 to the pump relief mixing valve 150. A relief line 152 with a pressure relief valve 154 is positioned in parallel with the pump 42. As can be appreciated, the pressure relief valve 154 can open when a predetermined pressure level of the working fluid is reached to prevent damage to the pump 42 or to other components of the power pack 20.

An evaporator inlet line 156 is connected to the pressure relief valve 154 and connects the pump 42 to the evaporator 70. In this manner, the power pack 20 includes a closed loop through which the working fluid can travel to operate the Rankine cycle and convert the waste heat energy of the exhaust gases from the engine 22 into mechanical and/or electrical energy.

As can be appreciated, the working fluid in the previously described working fluid loop 54 has different operating parameters as it travels through the power pack 20. For example, the working fluid has a relatively high temperature in certain portions of the working fluid loop 54 and a relatively low temperature in other portions of the working fluid loop 54. The working fluid also can have a relatively high pressure in some portions of the working fluid loop 54 and a relatively low pressure in other portions of the working fluid loop 54. Under these conditions, the working fluid can undergo phase changes as it travels through the working fluid loop 54 and can operate in the liquid phase in some portions of the working fluid loop 54 and in the vapor phase in other portions of the working fluid loop 54. In the example shown, the working fluid operates as a relatively high pressure liquid when the working fluid exits the pump 42 and moves through the working fluid pump outlet 146 and the evaporator inlet line 156. The working fluid can operate as a relatively low pressure liquid when the working fluid exits the condenser 86 and moves through the condenser working fluid outlet 128, the tank connecting line 132, the pump connecting line 138 and the working fluid pump inlet 142. The working fluid can operate as a relatively high pressure vapor when the working fluid exits the evaporator 70 and moves through the evaporator line 96, the expander inlet line 100 and the expander bypass 108. The working fluid can operate as a relatively low pressure vapor when the working fluid exits the expander 84 and moves through the expander outlet line 104 and the condenser working fluid inlet 110.

As further shown in FIG. 1, the power pack 20 can include one or more sensors positioned in various locations in the working fluid loop 54. The sensors operate to indicate an operating parameter of the working fluid in the working fluid loop 54 (or of the coolant fluid in the coolant fluid loop). As shown, a temperature sensor T1, a pressure sensor P1 and a level (or presence) sensor L1 can be positioned in communication with the pump connecting line 138 and can be operative to indicate a temperature, pressure and presence of the working fluid in the pump connecting line 138. A temperature sensor T2 and a pressure sensor P2 can be positioned in communication with the evaporator inlet line 156 and can be operative to indicate a temperature and pressure of the working fluid in the evaporator inlet line 156. A temperature sensor T3 and a pressure sensor P3 can be positioned in communication with the evaporator line 96 and can be operative to indicate a temperature and pressure of the working fluid in the evaporator inlet line 156. A temperature sensor T4 and a pressure sensor P4 can be positioned in communication with the expander inlet line 100 and can be operative to indicate a temperature and pressure of the working fluid in the expander inlet line 100. A temperature sensor T5 and a pressure sensor P5 can be positioned in communication with the expander outlet line 104 and can be operative to indicate a temperature and pressure of the working fluid in the expander outlet line 104. A temperature sensor T6 and a pressure sensor P6 can be positioned in communication with the condenser working fluid inlet 110 and can be operative to indicate a temperature and pressure of the working fluid in the condenser working fluid inlet 110. A temperature sensor T7 and a pressure sensor P7 can be positioned in communication with the condenser working fluid outlet 128 and can be operative to indicate a temperature and pressure of the working fluid in the condenser working fluid outlet 128. A temperature sensor T8 can be positioned in communication with the coolant fluid inlet 164 and can be operative to indicate a temperature of the coolant fluid in the coolant fluid inlet 164. A temperature sensor T9 and a volume flow sensor V1 can be positioned in communication with the coolant fluid outlet 166 and can be operative to indicate a temperature and volumetric flow of the coolant fluid in the coolant fluid outlet 166.

The aforementioned sensors can be any suitable sensors known to one skilled in the art. The sensors can also be coupled to the power pack control unit 158 via an information bus 160. Such an information bus 160 can collect and transmit information indicative of the temperature, pressure, flow, presence or other information to the power pack control unit 158. The power pack control unit 158 may also be operatively coupled (for example, via wired or wireless communication) with the expander control valve 98, the coolant fluid control valve 122, the coolant fluid drive motor 120, the bypass valve 68, the generator 92, the tank 88, the pressurized fluid source 134 and/or the working fluid pump motor 144. In response to receiving information indicative of the operating parameters of the working fluid from the sensors, the power pack control unit 158 can cause working fluid to be diverted by one or more of the control valves, the fluid pressure in the tank 88 to changed, the coolant fluid pump 118 to be driven in a different manner and/or the working fluid pump 90 to be driven in a different manner to change the operating parameters of the working fluid to achieve a predetermined efficiency of the power pack and/or to prevent damage to the power pack 20.

The power pack control unit 158 can be connected to elements that are external to the power pack 20. While not shown in this example, the power pack control unit 158 can be connected to an engine management system (EMS) and/or to a vehicle electronic control unit (VECU). In this manner, the power pack control unit 158 can send and receive signal to and from the vehicle's management systems so that the operation of the power system 18 is coordinated with the operation of the vehicle. The power pack control unit 158 can receive data from the vehicle's management systems such as the various operating parameters of the engine 22.

The power pack control unit 158 can include a suitable controller 162. In one example, the controller 162 can include a processor and non-transitory memory. The memory can have executable instructions, look-up tables and other suitable data that facilitates the operation of the power system 18. The controller 162 can include or be part of an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Figure 3:
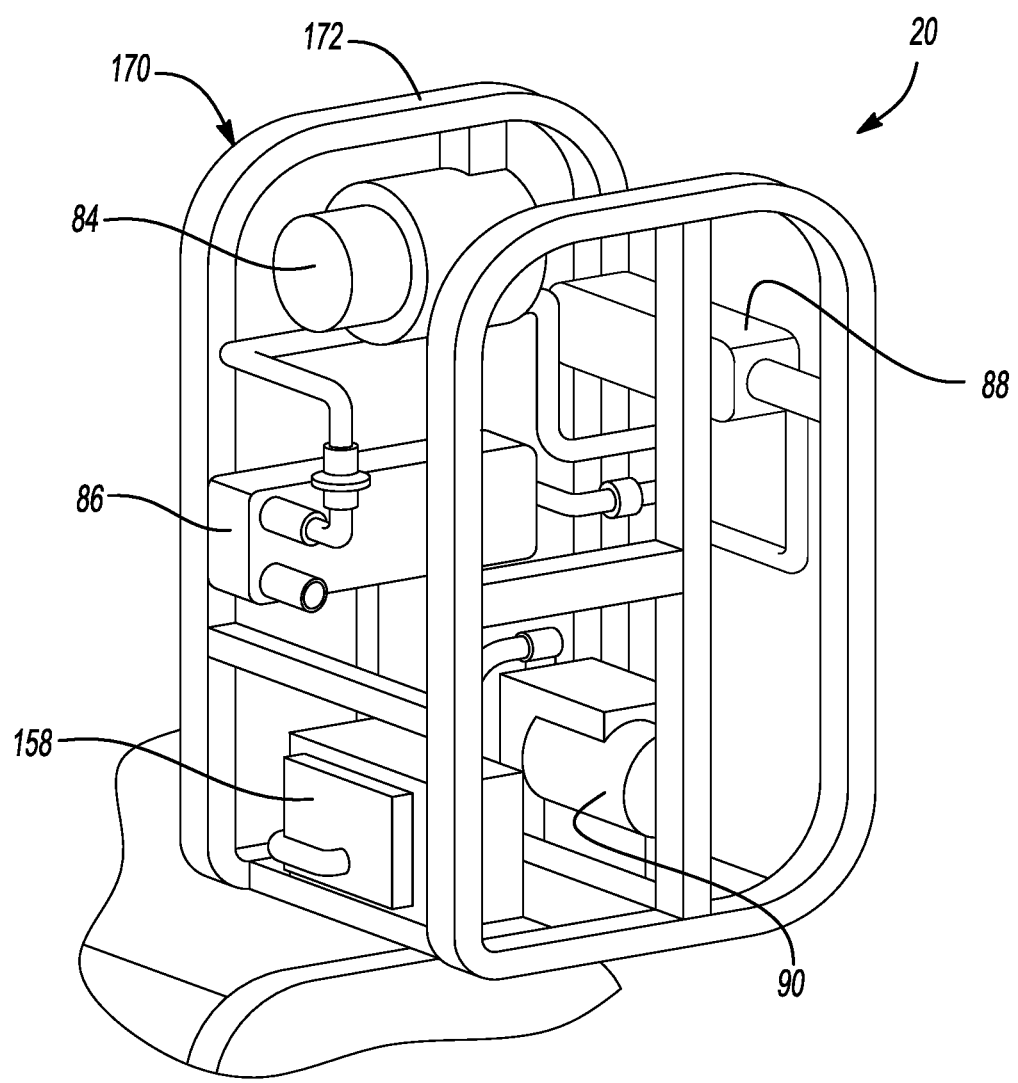
FIG. 3 is an illustration of an example power pack of the system of FIG. 1 shown with its cover removed.

FIG. 3 shows an example power pack 20. As shown, the power pack 20 includes the expander 84, the condenser 86, the power pack control unit 158, the tank 88 and the working fluid pump 90. These components are secured to a third housing 170. The third housing 170 can include a support structure 172 that is made of one or more structural members that create a frame around the power pack 20. For example, the support structure 172 can be made of tubular steel members formed into the shape as shown. In other examples, other suitable structural materials can be used. The support structure 172 can additionally include connection points through which fasteners can be used to secure the support structure to a vehicle. In other examples, support brackets (not shown) can project out from the support structure 172 and provide attachment surfaces for the attachment of the power pack 20 to a frame of a vehicle.

Figure 4:
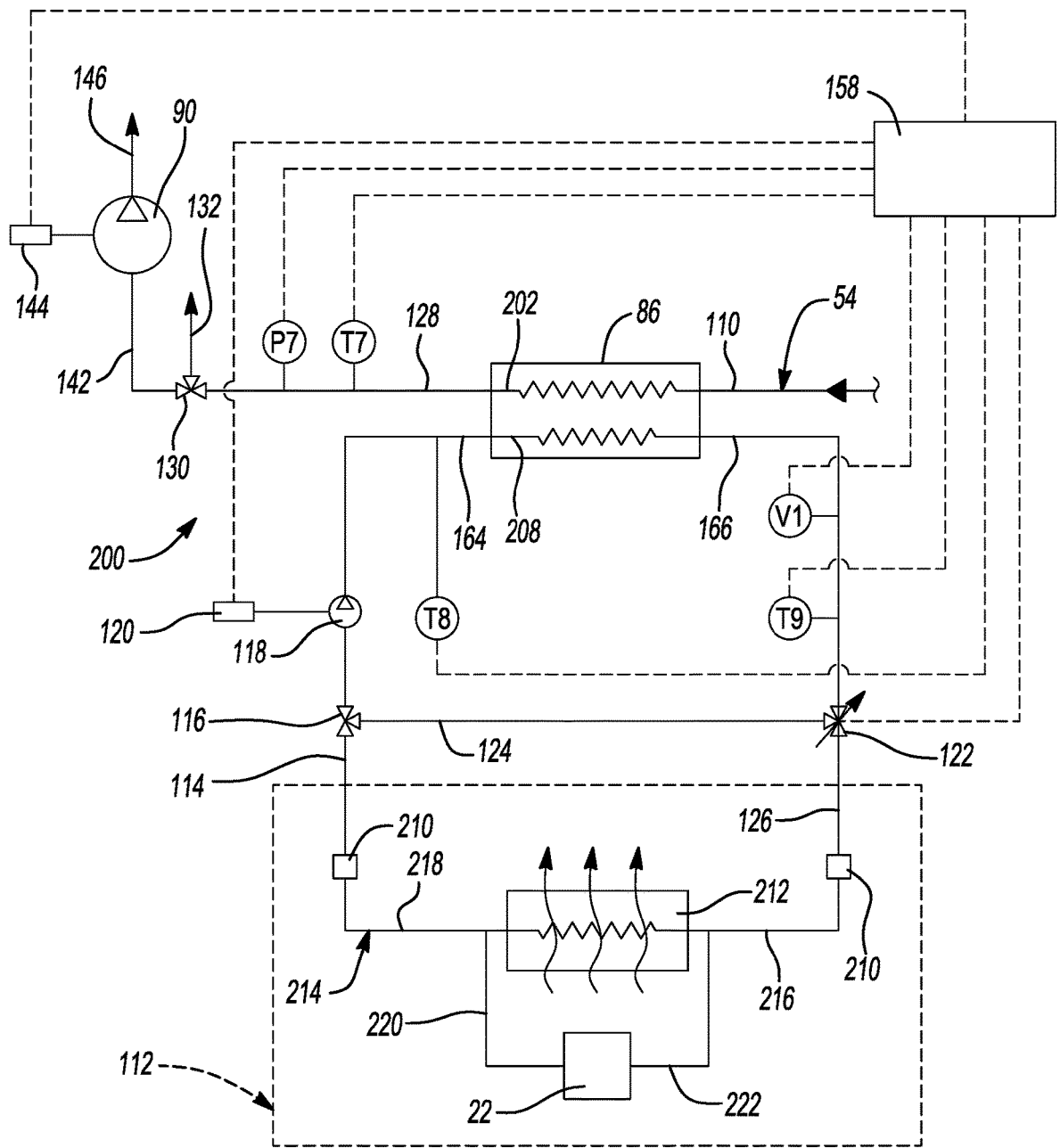
FIG. 4 is a block diagram showing an example condenser assembly of the power pack of FIG. 1.

With reference now to FIG. 4, an example condenser assembly 200 is shown connected to an example cooling system 112. The condenser assembly 200 can be part of the power pack 20 previously described. The condenser assembly 200 is operable to place the working fluid in the working fluid loop 54 in thermal communication with a coolant fluid inside the condenser 86. The coolant fluid can flow from the cooling system 112 into the condenser assembly 200. As shown, the example condenser assembly 200 includes a working fluid conduit 202 that permits the working fluid to flow through the condenser 86 from the condenser working fluid inlet 110 to the condenser working fluid outlet 128. As can be appreciated, the working fluid conduit 202 is part of (or can be connected to) the working fluid loop 54 of the power pack 20. As such, the condenser working fluid inlet 110 can permit the working fluid to flow from the expander 84 (FIG. 1) and into the condenser 86. The condenser working fluid outlet 128 can permit fluid to flow from the condenser 86 to the tank mixing valve 130. The working fluid can continue to flow through the tank mixing valve 130 to the working fluid pump 90. The working fluid can continue downstream of the working fluid pump 90 through the working fluid pump outlet 146 to the evaporator 70 (FIG. 1) of the power pack 20 as previously described.

The working fluid conduit 202 is operable to place the working fluid in thermal communication with a coolant fluid in a coolant fluid conduit 208 inside the condenser 86. The coolant fluid can be any suitable coolant fluid such as water or other liquid and can include anti-freezing additives or anti-corrosion additives. The coolant fluid can flow into the condenser 86 through a coolant fluid inlet 164 and out of the condenser 86 through a coolant fluid outlet 166. The coolant fluid can flow from the coolant fluid outlet 166 and into the coolant fluid control valve 122. The coolant fluid control valve 122 can be any suitable control valve that is operable to vary a portion of the coolant fluid that is routed into the coolant fluid bypass 124 rather than being routed into the cooling system 112 through the cooling system inlet 126. As will be further described, the coolant fluid control valve 122 can cause the coolant fluid to be routed through the coolant fluid bypass 124 or to be routed into the cooling system 112 or be routed through both in varying proportions.

The coolant fluid bypass 124 is a length of conduit that extends between the coolant fluid bypass 124 and the coolant fluid mixing valve 116. The coolant fluid bypass 124 is positioned outside of the condenser 86 and outside of the cooling system 112. In this configuration, the cooling fluid that flows through the coolant fluid bypass 124 can mix with coolant fluid that is flowing from the cooling system 112 at the coolant fluid mixing valve 116. Since a temperature of the coolant fluid that is flowing through the coolant fluid bypass 124 can be different from a temperature of the coolant fluid that is flowing from the cooling system 112 through the cooling system outlet 114, the amount of cooling fluid that is diverted through the coolant fluid bypass 124 can be used to vary the temperature of the coolant fluid that flows out of the coolant fluid mixing valve 116 and into the coolant fluid pump 118 and into the condenser 86.

The cooling system 112, in the example shown, is a cooling system of a vehicle that can additionally be used to cool the internal combustion engine 22. The cooling system can be attached to the condenser assembly 200 using one or more cooling system connectors 210. The cooling system connectors 210 can be any suitable tubing or conduit connectors that permit the cooling system outlet 114 and the cooling system inlet 126 to be easily connected (and disconnected) from the condenser assembly 200 for installation, service or maintenance. In one example, the cooling system connectors 210 are quick-connect connectors that permit the cooling system outlet 114 and the cooling system inlet 126 to be connected to the condenser assembly 200 without the need for specialized tools.

The cooling system 112 can include the radiator 212 that is fluidly connected to the condenser assembly 200 by the cooling system loop 214. The radiator 212 can by any suitable heat exchanger that permits the coolant fluid that flows from a radiator inlet 216 to a radiator outlet 218 to be cooled by ambient air that can flow through radiator 212. As further shown in FIG. 4, the cooling system 112 can include an engine cooling inlet 220 and an engine cooling outlet 222. As can be appreciated, the coolant fluid can flow through the engine 22 from the engine cooling inlet 220 to the engine cooling outlet 222 to cool the engine 22 during operation. While not shown in FIG. 4, the cooling system 112, in other examples, can include other cooling system bypass lines, coolant fluid conduits, control valves, pumps, sensors and control devices for cooling the engine 22 and/or for managing heat transfer between other components of the vehicle.

As further shown in FIG. 4, the condenser assembly 200 can include the power pack control unit 158. In other examples, the condenser assembly 200 can include a separate control unit that is similar to the power pack control unit 158 as previously described except that such other control unit can be a control unit separate from the power pack control unit 158. In instances in which the condenser assembly 200 includes a separate control unit, the control unit can be in communication with the power pack control unit 158.

The power pack control unit 158 can be operably connected via wired or wireless connections with the temperature sensors T7, T8, T9, the pressure sensor P7, the flow sensor V1, the working fluid pump motor 144, the coolant fluid drive motor 120, and the coolant fluid control valve 122. The power pack control unit 158 can communicate with these components to send or receive signals to determine the operating conditions of the condenser assembly 200 and to adjust or control the operation of the condenser assembly 200.

For example, the power pack control unit 158 can be in communication with the coolant fluid control valve 122 and can adjust the amount of coolant fluid that flows through the coolant fluid bypass 124. The power pack control unit 158 can also cause the coolant fluid drive motor 120 to operate the coolant fluid pump 118 to move the coolant fluid through the coolant fluid conduit 208 in the condenser 86 at a predetermined mass flow rate. Such adjustment by the power pack control unit 158 of the coolant fluid control valve 122 and the coolant fluid pump 118 can cause the temperature and flow rate of the coolant fluid in the condenser 86 to be varied. As the temperature and/or the flow rate of the coolant fluid in the condenser 86 is varied, the heat transfer that occurs between the working fluid in the working fluid conduit 202 and the coolant fluid in the coolant fluid conduit 208 can change as well.

It is desirable to achieve a predetermined temperature of the working fluid at the condenser working fluid outlet 128 and/or at the working fluid pump inlet 142. It can be desirable, for example, that the working fluid is subcooled to a temperature below the temperature at which the working fluid vaporizes when the working fluid flows from the condenser 86 and into the working fluid pump 90. When the working fluid is subcooled, cavitation in the working fluid pump 90 is prevented. In addition, the degree of subcooling of the working fluid at the condenser working fluid outlet 128 and/or at the working fluid pump inlet 142 can be adjusted to increase or maximize the efficiency of the power pack 20.

Figure 5:
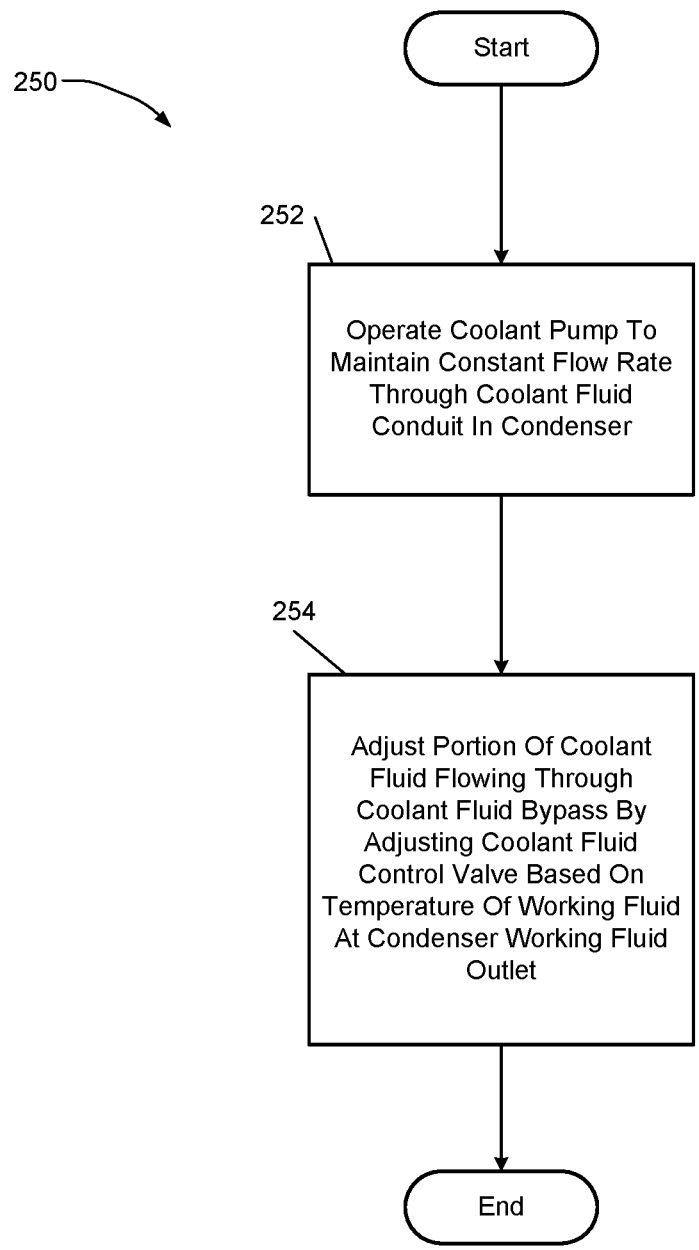
FIG. 5 is a flow chart showing one example method of operating the condenser assembly of FIG. 4.

In one example method 250 shown in FIG. 5, the method 250 is initiated when the power pack 20 is initiated or started by a user. At step 252, the power pack control unit 158 operates the coolant fluid pump 118 to cause the coolant fluid to flow through the coolant fluid conduit 208 in the condenser 86 at a constant flow rate. The constant flow rate of the coolant fluid through the coolant fluid conduit 208 can be a constant mass flow rate. At step 254, the power pack control unit 158 can vary or adjust the portion of the coolant fluid that flows through the coolant fluid bypass 124 by controlling or adjusting the coolant fluid control valve 122. The power pack control unit 158 can vary the portion of the coolant fluid that flows through the coolant fluid bypass 124 based on a temperature of the working fluid at the condenser working fluid outlet 128 (or at the working fluid pump inlet 142). In this manner, the power pack control unit 158 can operate the condenser assembly 200 to cause the coolant fluid to flow through the coolant fluid conduit 208 to maintain the working fluid in a subcooled condition at the condenser working fluid outlet 128 (or at the working fluid pump inlet 142).

Such operation of the condenser assembly 200 is desirable because it simplifies and reduces the adjustments that are necessary to achieve a subcooled temperature of the working fluid at the condenser working fluid outlet 128. Rather than adjusting both the flow rate of the coolant fluid through the coolant fluid conduit 208 and the amount of coolant fluid that flows through the coolant fluid bypass 124, the power pack control unit 158, in this example, maintains the flow rate at a constant mass flow rate and only varies the portion of coolant fluid that flows through the coolant fluid bypass. Such operation of the condenser assembly 200 can be a linear relationship between the portion of the coolant fluid that flows through the coolant fluid bypass 124 and the temperature of the working fluid at the condenser working fluid outlet 128. For example, one or more temperature thresholds can be used to determine the amount of coolant fluid that is permitted to flow through the coolant fluid bypass 124. In one example, the power pack control unit 158 controls the coolant fluid control valve 122 to selectively control the relative proportions of the coolant fluid that flows to the cooling system inlet 126 or to the coolant fluid bypass 124. In one example, the power pack control unit 158 controls the coolant fluid control valve 122 such that all of the coolant fluid flows through the coolant fluid bypass 124. The power pack control unit 158, in this example, continues to operate the condenser assembly 200 at this setting until the temperature of the working fluid at the condenser working fluid outlet 128 reaches a first temperature threshold T-1. When the temperature of the working fluid at the condenser working fluid outlet 128 reaches the first temperature threshold T-1, the power pack control unit 158 causes the coolant fluid control valve 122 to route 50% of the coolant fluid through the coolant fluid bypass 124 and 50% of the coolant fluid through the cooling system 112. The power pack control unit 158 can continue to operate in this manner until the temperature of the working fluid at the condenser working fluid outlet 128 reaches a second temperature threshold T-2. When the temperature of the working fluid at the condenser working fluid outlet 128 reaches the second temperature threshold T-2, the power pack control unit 158 can cause the coolant fluid control valve 122 to route none of the coolant fluid through the coolant fluid bypass 124 and 100% of the coolant fluid through the cooling system inlet 126 to the cooling system 112. As can be appreciated, the power pack control unit 158 can operate in a reverse manner to cause the coolant fluid control valve 122 to route the previously described proportions of the coolant fluid through the coolant fluid bypass 124 or to the cooling system 112 when the temperature of the working fluid at the condenser working fluid outlet 128 falls below the first temperature threshold T-1 or the second temperature threshold T-2. In still other examples, more than two temperature thresholds can be used and the power pack control unit 158 can cause the coolant fluid control valve 122 to have other variable settings to permit other portions of the coolant fluid (other than 0%, 50% and 100%, for example) to flow through the coolant fluid bypass 124 and/or to the cooling system 112.

Figure 6:
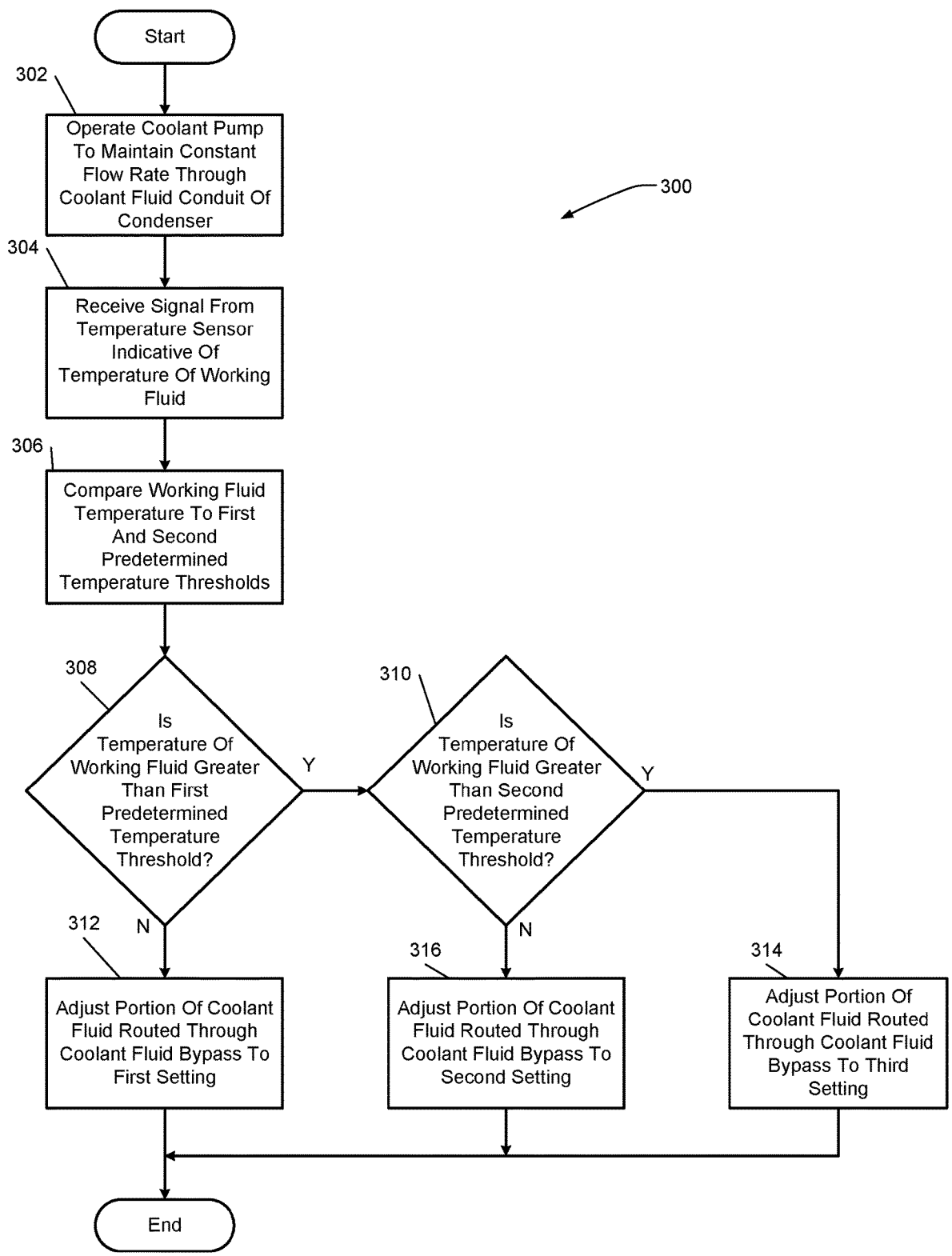
FIG. 6 is a flow chart showing another example method of operating the condenser assembly of FIG. 4.

Referring now to FIG. 6, an example method 300 of operating the condenser assembly is shown. The method 300 can start when the power pack 20 is activated upon ignition of the engine 22 of the vehicle or by an input from a user through a control panel or other input device. At step 302, the power pack control unit 158 causes the coolant fluid pump 118 (and/or the coolant fluid drive motor 120) to operate such that a constant flow rate of the coolant fluid flows through the coolant fluid conduit 208 of the condenser 86. The power pack control unit 158 can maintain a constant mass flow rate of the coolant fluid during operation of the condenser assembly 200. While not shown in the method 300, the power pack control unit 158 can receive a signal from the flow sensor V1 and compare it to a desired constant flow rate in order to determine whether the coolant fluid pump 118 is maintaining the constant flow rate. If needed, the power pack control unit 158 can adjust the coolant fluid drive motor 120 and/or the coolant fluid pump 118 to maintain the desired constant flow rate.

The method 300 continues to step 304. At step 304, the power pack control unit 158 can receive signals from the sensors of the condenser assembly 200. The power pack control unit 158 can receive a signal from a temperature sensor positioned in the working fluid loop 54 that is indicative of a temperature of the working fluid. For example, the power pack control unit 158 can receive a signal from the temperature sensor T7 indicative of a temperature of the working fluid at the condenser working fluid outlet 128. In another example, the power pack control unit 158 can receive a signal from the temperature sensor T1 indicative of a temperature of the working fluid at the working fluid pump inlet 142. As can be appreciated, the power pack control unit can also receive signals from the flow sensor V1, the temperature sensor T8, the temperature sensor T9 and/or the pressure sensor P7.

At step 306, the power pack control unit 158 can compare the temperature of the working fluid to one or more predetermined temperature thresholds (e.g. the first temperature threshold T-1 and/or the second temperature threshold T-2). The temperature of the working fluid is determined by the power pack control unit 158 based on the signals received from the temperature sensor T7 or the temperature sensor T1, for example. The power pack control unit 158 can receive the signal from the temperature sensor T7 that is positioned at the condenser working fluid outlet 128. The power pack control unit 158 can determine the temperature of the working fluid at the condenser working fluid outlet 128 based on the signal from the temperature sensor T7. Based on the signal from the temperature sensor T7, the power pack control unit 158 can determine whether the temperature of the working fluid at the condenser working fluid outlet 128 is greater than or less than the one or more predetermined temperature thresholds. The example method 300, the power pack control unit 158 can compare the temperature of the working fluid to the first predetermined temperature threshold and to the second predetermined temperature threshold. In other examples (as previously described), the power pack control unit 158 can compare the temperature of the working fluid to more than two predetermined thresholds, as desired. In still other examples, the power pack control unit 158 can compare the temperature of the working fluid at the working fluid pump inlet 142 to the one or more predetermine thresholds based on the signal received from the temperature sensor T1.

At step 308, the power pack control unit 158 can determine if the temperature of the working fluid is greater than the first predetermined temperature threshold. If the temperature of the working fluid is greater than the first predetermined temperature threshold, the method 300 continues to step 310. If the temperature of the working fluid is less than or equal to the first temperature threshold, the method continues to step 312.

At step 312, the power pack control unit 158 can adjust the portion of coolant fluid that is routed through the coolant fluid bypass 124 to a first setting. The power pack control unit 158 can adjust the portion of coolant routed through the coolant fluid bypass 124 by sending a signal to the coolant fluid control valve 122. In one example, as previously described, the first setting can correspond to a condition of the coolant fluid control valve 122 in which 100% of the coolant fluid from the condenser coolant fluid outlet 166 is routed through the coolant fluid bypass 124 and none of the coolant fluid is routed through to the cooling system 112 through the cooling system inlet 126. In other examples, the first setting can correspond to other conditions of the coolant fluid control valve 122 in which different proportions of the coolant fluid is routed through either the coolant fluid bypass 124 or the cooling system inlet 126.

As step 310, the power pack control unit 158 can determine if the temperature of the working fluid is greater than the second predetermined temperature threshold. If the temperature of the working fluid is greater than the second predetermined temperature threshold, the method 300 continues to step 314. If the temperature of the working fluid is not greater than the predetermined temperature threshold, the method continues to step 316.

At step 316, the power pack control unit 158 has determined that the temperature of the working fluid is greater than the first predetermined threshold and not greater than the second predetermined threshold. The power pack control unit 158 can adjust the portion of the coolant fluid routed through the coolant fluid bypass 124 to a second setting. The second setting, in one example, corresponds to a condition of the coolant fluid control valve 122 in which 50% of the coolant fluid from the condenser coolant fluid outlet 166 is routed through the coolant fluid bypass 124 and 50% of the coolant fluid is routed to the cooling system 112 through the cooling system inlet 126. In other examples, the second setting can correspond to other conditions of the coolant fluid control valve 122 in which different proportions of the coolant fluid is routed through either the coolant fluid bypass 124 or the cooling system inlet 126.

At step 314, the power pack control unit 158 can adjust the portion of the coolant fluid routed through the coolant fluid bypass 124 to a third setting. The third setting, in one example, corresponds to a condition of the coolant fluid control valve 122 in which none of the coolant fluid flowing from the condenser coolant fluid outlet 166 is routed through the coolant fluid bypass 124 and 100% of the coolant fluid is routed to the cooling system 112 through the cooling system inlet 126. In other examples, the third setting can correspond to other conditions of the coolant fluid control valve 122 in which different proportions of the coolant fluid is routed through either the coolant fluid bypass 124 or the cooling system inlet 126.

After steps 312, 314 or 316, the method 300 can end. If the power pack 20 continues to operate, however, the method 300 can be repeated in order to continue to operate and adjust the portion of coolant fluid routed through the coolant fluid bypass 124 based on the temperature of the working fluid. As can be appreciated, the method 300 can end when the power pack 20 is deactivated when a user switches the power pack 20 to an inactivate state or when the vehicle is turned off.

Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly adjacent to," "directly connected to," or "directly coupled to" another element or layer, there may be no intervening elements or layers present. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A waste heat recovery system in thermal communication with an exhaust conduit of an internal combustion engine of a vehicle, the waste heat recovery system comprising:

a condenser including:
  a working fluid conduit configured to connect to a working fluid loop of the waste heat recovery system; and
  a coolant fluid conduit configured to connect to a coolant fluid loop used to cool the internal combustion engine of the vehicle, the coolant fluid conduit including a coolant fluid inlet and a coolant fluid outlet wherein a volume of coolant fluid flows from the coolant fluid inlet to the coolant fluid outlet when the coolant fluid conduit is connected to the coolant fluid loop; and
  a coolant fluid bypass fluidly connected between the coolant fluid inlet and the coolant fluid outlet, the coolant fluid bypass including a coolant fluid control valve configured to vary a portion of the volume of coolant fluid that flows through the coolant fluid bypass based on a temperature of a working fluid in the working fluid loop,
  the waste heat recovery system further comprising a power pack control unit electrically coupled to the coolant fluid control valve and to a condenser working fluid outlet temperature sensor, the condenser working fluid outlet temperature sensor operable to send a signal to the power pack control unit indicative of the temperature of the working fluid at an outlet of the working fluid conduit from the condenser, wherein the power pack control unit is operable to send a control signal to the coolant fluid control valve to vary the portion of the volume of coolant fluid that flows through the coolant fluid bypass.

2. The waste heat recovery system of claim 1 further comprising a coolant fluid pump fluidly connected to the coolant fluid conduit upstream of the condenser, the coolant fluid pump configured to maintain a constant flow rate of the coolant fluid through the condenser.

3. The waste heat recovery system of claim 2 further comprising:
  a coolant fluid outlet temperature sensor operable to send a signal indicative of a temperature of the coolant fluid in the coolant fluid outlet.

4. The waste heat recovery system of claim 1 wherein the temperature of the working fluid in the working fluid loop is a temperature of the working fluid at an outlet of the working fluid conduit from the condenser.

5. The waste heat recovery system of claim 1 wherein the temperature of the working fluid in the working fluid loop is a temperature of the working fluid at an inlet of a working fluid pump fluidly connected in the working fluid loop downstream of the condenser.

6. The waste heat recovery system of claim 1 wherein the coolant fluid control valve is operable to decrease the portion of the volume of coolant fluid flowing through the coolant fluid bypass when the temperature of the working fluid at an outlet of the working fluid conduit is greater than a predetermined temperature threshold.

7. The waste heat recovery system of claim 1 wherein the coolant fluid control valve is operable to increase the portion of the volume of coolant fluid flowing through the coolant fluid bypass when the temperature of the working fluid at an outlet of the working fluid conduit is less than a predetermined threshold.

8. The waste heat recovery system of claim 1 wherein the coolant fluid bypass is positioned outside the condenser between the coolant fluid inlet and the coolant fluid outlet.

9. A waste heat recovery system in thermal communication with an exhaust conduit of an internal combustion engine of a vehicle, the waste heat recovery system comprising:
  a working fluid loop fluidly connecting a working fluid pump, an evaporator and an expander and allowing a volume of working fluid to flow therethrough;
  a condenser assembly fluidly connected to the working fluid loop between the expander and the working fluid pump, the condenser assembly including:
    a coolant fluid conduit configured to connect to a coolant fluid loop of a coolant system of the vehicle, the coolant fluid conduit including a coolant fluid inlet and a coolant fluid outlet wherein a volume of coolant fluid of the coolant system flows from the coolant fluid inlet to the coolant fluid outlet when the coolant fluid conduit is connected to the coolant fluid loop; and
    a coolant fluid bypass fluidly connected between the coolant fluid inlet and the coolant fluid outlet, the coolant fluid bypass including a coolant fluid control valve, the coolant fluid control valve configured to vary a portion of the volume of coolant fluid that flows through the coolant fluid bypass;
  a temperature sensor positioned downstream of the condenser assembly and operable to output a signal indicative of a temperature of the working fluid before the working fluid enters the working fluid pump; and
  a control unit in communication with the temperature sensor and the coolant fluid control valve, wherein the control unit selectively controls the coolant fluid control valve to vary the portion of the volume of coolant fluid that flows through the coolant fluid bypass based on the signal from the temperature sensor.

10. The waste heat recovery system of claim 9 further comprising a coolant fluid pump fluidly connected between the coolant fluid bypass and the coolant fluid inlet upstream of the condenser, the coolant fluid pump configured to maintain a constant mass flow rate of the coolant fluid in the coolant fluid conduit.

11. The waste heat recovery system of claim 9 wherein the temperature sensor is positioned at a working fluid outlet of the condenser assembly.

12. The waste heat recovery system of claim 9 further comprising a working fluid tank fluidly connected to the working fluid loop between the working fluid pump and the condenser assembly, wherein the temperature sensor is positioned between the working fluid tank and the condenser assembly.

* * * * *